(12) United States Patent
Allen

(10) Patent No.: US 8,370,720 B2
(45) Date of Patent: Feb. 5, 2013

(54) MASS STORAGE DEVICE AND METHOD FOR OFFLINE BACKGROUND SCRUBBING OF SOLID-STATE MEMORY DEVICES

(75) Inventor: William J. Allen, Cupertino, CA (US)

(73) Assignee: OCZ Technology Group, Inc., San Jose, CA (US)

( * ) Notice: Subject to any disclaimer, the term of this patent is extended or adjusted under 35 U.S.C. 154(b) by 345 days.

(21) Appl. No.: 12/859,595

(22) Filed: Aug. 19, 2010

(65) Prior Publication Data

US 2011/0231730 A1 Sep. 22, 2011

Related U.S. Application Data

(60) Provisional application No. 61/235,103, filed on Aug. 19, 2009.

(51) Int. Cl.
*G11C 29/00* (2006.01)
(52) U.S. Cl. ...................................................... 714/773
(58) Field of Classification Search .................. 714/773
See application file for complete search history.

(56) References Cited

U.S. PATENT DOCUMENTS

| | | | | | |
|---|---|---|---|---|---|
| 4,438,494 | A | * | 3/1984 | Budde et al. ........................ 714/2 |
| 5,479,408 | A | * | 12/1995 | Will ................. 370/313 |
| 5,632,012 | A | * | 5/1997 | Belsan et al. ................ 714/6.12 |
| 6,157,944 | A | * | 12/2000 | Pedersen ........................ 709/204 |
| 6,263,452 | B1 | * | 7/2001 | Jewett et al. ................. 714/5.11 |
| 6,292,869 | B1 | * | 9/2001 | Gerchman et al. ............ 711/106 |
| 6,848,063 | B2 | * | 1/2005 | Rodeheffer et al. ............ 714/6.2 |
| 7,012,835 | B2 | * | 3/2006 | Gonzalez et al. ........ 365/185.11 |
| 7,100,004 | B2 | * | 8/2006 | Chen Johnson et al. ...... 711/159 |
| 7,346,806 | B2 | * | 3/2008 | Forrer et al. ................. 714/6.22 |
| 7,412,574 | B2 | * | 8/2008 | Jeddeloh ........................ 711/158 |
| 7,432,940 | B2 | * | 10/2008 | Brook et al. ................... 345/629 |
| 7,434,012 | B1 | * | 10/2008 | Ives et al. ...................... 711/159 |
| 7,467,262 | B2 | * | 12/2008 | Clark et al. .................... 711/141 |
| 7,496,823 | B2 | * | 2/2009 | Wheeler et al. ............... 714/764 |
| 7,774,539 | B2 | * | 8/2010 | Mettler et al. ................. 711/112 |
| 8,140,752 | B2 | * | 3/2012 | Hart et al. ...................... 711/114 |
| 8,176,405 | B2 | * | 5/2012 | Hafner et al. .................. 714/807 |
| 8,205,118 | B2 | * | 6/2012 | Lyons et al. .................. 714/38.1 |
| 8,225,181 | B2 | * | 7/2012 | Perlmutter et al. ........... 714/773 |
| 2002/0162075 | A1 | | 10/2002 | Talagala |
| 2003/0191888 | A1 | * | 10/2003 | Klein ............................ 711/105 |
| 2004/0243886 | A1 | * | 12/2004 | Klein .............................. 714/42 |

(Continued)

OTHER PUBLICATIONS

Thomas J.E. Schwarz, S.J. Qin Xin; Ethan L. Miller; Darrell D.E. Long; Andy Hospodor; Spender NG; Disk Scrubbing in Large Archival Storage Systems; IEEE Computer Society's 12th Annual International Symposium on Modeling, Analysis, and Simulation of Computer and Telecommunications Systems; 1526-7539/04; 2004.

*Primary Examiner* — Amine Riad
(74) *Attorney, Agent, or Firm* — Hartman Global IP Law; Gary M. Hartman; Domenica N.S. Hartman

(57) ABSTRACT

A solid-state mass storage device and method for its operation that includes performing preemptive scrubbing of data during offline periods or disconnects from a host system to which the mass storage device is attached. The device includes a system interface adapted to connect the drive to a host system, at least one nonvolatile memory device, controller means through which data pass when being written to and read from the memory device, a volatile memory cache, a system logic device, and an integrated power source for powering the drive. The system logic device is configured to operate when the drive is not functionally connected to a host system, execute copy commands without accessing a host system, and prioritize preemptive scrubbing of addresses in the memory device on the basis of risk of data loss based on one or more parameters logged by the internal system logic device.

17 Claims, 2 Drawing Sheets

U.S. PATENT DOCUMENTS

| | | | |
|---|---|---|---|
| 2006/0271743 A1* | 11/2006 | Clark et al. | 711/141 |
| 2007/0156557 A1* | 7/2007 | Shao et al. | 705/35 |
| 2007/0259416 A1* | 11/2007 | Parker et al. | 435/266 |
| 2009/0070539 A1* | 3/2009 | Haustein et al. | 711/162 |
| 2009/0083504 A1* | 3/2009 | Belluomini et al. | 711/162 |
| 2010/0049815 A1* | 2/2010 | Vanecek et al. | 709/206 |
| 2010/0332900 A1* | 12/2010 | Yang | 714/16 |
| 2011/0047322 A1* | 2/2011 | Allen et al. | 711/103 |
| 2011/0231730 A1* | 9/2011 | Allen | 714/758 |
| 2011/0320709 A1* | 12/2011 | Han et al. | 711/114 |

* cited by examiner

MASS STORAGE DEVICE AND METHOD FOR OFFLINE BACKGROUND SCRUBBING OF SOLID-STATE MEMORY DEVICES

CROSS REFERENCE TO RELATED APPLICATIONS

This application claims the benefit of U.S. Provisional Application Nos. 61/235,103 filed Aug. 19, 2009. The contents of this prior application are incorporated herein by reference.

BACKGROUND OF THE INVENTION

The present invention generally relates to memory devices for use with computers and other processing apparatuses. More particularly, this invention relates to a non-volatile or permanent memory-based mass storage device using background scrubbing during power-down periods of the host system or during physical disconnects from the host system to identify faulty storage addresses.

NAND flash memory-based mass storage devices, and particularly solid state SATA drives, are becoming important players in the mass storage device market. Primary reasons for the rapid acceptance of these solid state drives (SSDs) are the extremely fast access times for data, along with low power requirements compared to earlier electromechanical hard disk drives (HDDs). As a rough estimate, the maximum power consumption of a 125 GB SSD is often in the range of about 1.5 to 2 Watts, depending on the integrated circuits (ICs) used. This energy efficiency opens up a number of possibilities for operating the drives that are not possible in the case of HDDs.

Of particular interest related to energy efficiency is the possibility of powering SSDs with batteries to allow housekeeping functions to be autonomously performed during offline periods. This capability can help to avoid traffic congestion during periods of usage by performing a surface scrub for bad blocks when the host system is powered off. The demand for surface scrubbing in SSDs originates in the inherent weaknesses of NAND flash memory with respect to data retention and write endurance. Both become progressively worse with every transition to a new process node. For example, interactions are encountered with smaller geometries in the form of proximity disturbances that can occur within a memory cell when a nearby cell is read or written to. In addition, exposure to high temperature and/or changes in temperature can lead to data loss due to recoverable bit errors. The latter can contribute to offline data loss, that is, a drive without problems during its last operation can suddenly develop problems even if it is powered off, and may fail without warning on the next attempt of operation. Moreover, in contrast to HDDs with an almost unlimited offline data retention, SSDs based on NAND flash technology typically are expected to retain data only for 6 months. Consequently, offline loss of data is often unpredictable since it occurs independent of the operation of the device with its host system.

More generally, the checking of data integrity in mass storage systems during periods of no-transfers is often referred to as disc scrubbing, as described by Schwartz et al., Modeling, Analysis, and Simulation of Computer and Telecommunications Systems, Proceedings of the IEEE Computer Society's 12th Annual International Symposium, 409 (Oct. 4-8, 2004). The underlying principle is to use idle periods of drives to check for bad blocks of memory and then rebuild the data in a different location. U.S. Pat. No. 5,632,012 to Belsan describes such a disk scrubbing system. U.S. Patent Application 2002/0162075 to Talagala describes disk scrubbing at the disk controller level wherein the disk controller reads back data during idle phases and generates a checksum that is compared to a previously stored checksum for the same data. Any disparity between the checksums of the area scanned is used to identify bad data and initiates rebuilding of the data at different addresses using redundancy mechanisms.

U.S. Pat. No. 6,292,869 to Gerchman et al. describes the interruption of self-timed refresh upon receiving a scrub command from the system to scrub memory arrays. U.S. Pat. No. 6,848,063 by Rodeheffer teaches memory scrubbing of very large memory arrays using timer-based scan rates, wherein the scan rate can be defined depending on the requirements of the system.

The above prior art does not disclose or suggest a self-contained mass storage device that can autonomously perform surface scrubbing.

BRIEF SUMMARY OF THE INVENTION

The present invention provides for a self-sustained mode of operation of a solid-state mass storage device that includes internal back-up power and additional internal system logic to perform preemptive scrubbing of data during offline periods or disconnects from a host system to which the mass storage device is attached.

According to a first aspect of the invention, a self-powered solid-state drive method is provided that is configured to perform offline scrubbing of solid-state mass storage media. The drive includes a package comprising a printed circuit board, a system interface coupled to the circuit board and adapted to connect the drive to a host system, at least one nonvolatile memory device on the circuit board, controller means on the circuit board through which data pass when being written to and read from the memory device, a volatile memory cache on the circuit board, means on the circuit board for performing the function of a real-time clock on the circuit board, a system logic device configured to operate when the drive is not functionally connected to a host system, execute copy commands without accessing a host system, and prioritize preemptive scrubbing of addresses in the memory device on the basis of risk of data loss based on one or more parameters logged by the internal system logic device, and an integrated power source on the circuit board for powering the drive.

According to a second aspect of the invention, a method is provided that entails performing an offline scrubbing operation using the drive described above, wherein the scrubbing operation is prioritized based on at least one parameter relating to the risk of data loss of the memory blocks and analyzed by the system logic device.

According to a third aspect of the invention, a method is provided for performing offline scrubbing of solid-state mass storage media of a self-powered solid-state drive. The method includes initiating a scrubbing operation to be performed by a system logic device on blocks of memory of the solid-state mass storage media following a predetermined period of time after the drive has gone offline from a host system, and prioritizing the scrubbing operation based on at least one parameter analyzed by the system logic device and chosen from the group consisting of: age of data at an address of the solid-state mass storage media; number and frequency of accesses of data at an address of the solid-state mass storage media; time to program a block of memory; time to erase a block of memory; and number of errors corrected through ECC algorithms. The scrubbing operation is then performed with the system logic device, and involves determining whether data in a first block of memory at a first address are at risk of data loss, and then moving the data in the first block to a second block at a second address.

As indicated above, a preferred aspect of the invention is that the mass storage device and method operate to prioritize preemptive scrubbing of addresses in the memory device on the basis of risk of data loss, which in turn is based on one or more parameters that can be logged on the internal system logic device. As nonlimiting examples, the internal system logic device may log the age of data, number of read accesses, number of error bits, as well as write accesses to cells in proximity to an address of interest. Data in any at-risk memory block containing the original address of the data can then be moved, or scrubbed, from the at-risk block and moved to another address, after which the at-risk block can be marked as invalid. According to optional aspects of the invention, subsequent erase and program times of blocks of memory can also be used to determine the operability of individual blocks and, if necessary, retire those blocks. Furthermore, additional testing of retired blocks can be performed to re-enter them into the active pool of blocks to account for the possibility of an environmental factor-based recovery of a block that was previously determined to be bad.

Because most currently used standard controllers for mass storage devices are not able to perform data copy on the device itself, but rather must access the system memory of its host computer to read out data and then write them back to the mass storage device, the internal system logic device employed by the present invention preferably has the capability to execute copy commands without accessing the host system. According to a particularly preferred aspect of the invention, such a device can be a system-on-a-chip or system-on-a-card (SoC), which may be a discrete device or in the form of a SoC-based controller. Preferred SoC-based devices are further equipped with a processor and integrated memory to have the further capability of keeping records of the parameters that may contribute to potential corruption of data in a block of memory of a solid-state mass storage media.

Other objects and advantages of this invention will be better appreciated from the following detailed description.

DETAILED DESCRIPTION OF THE INVENTION

Figure 1:
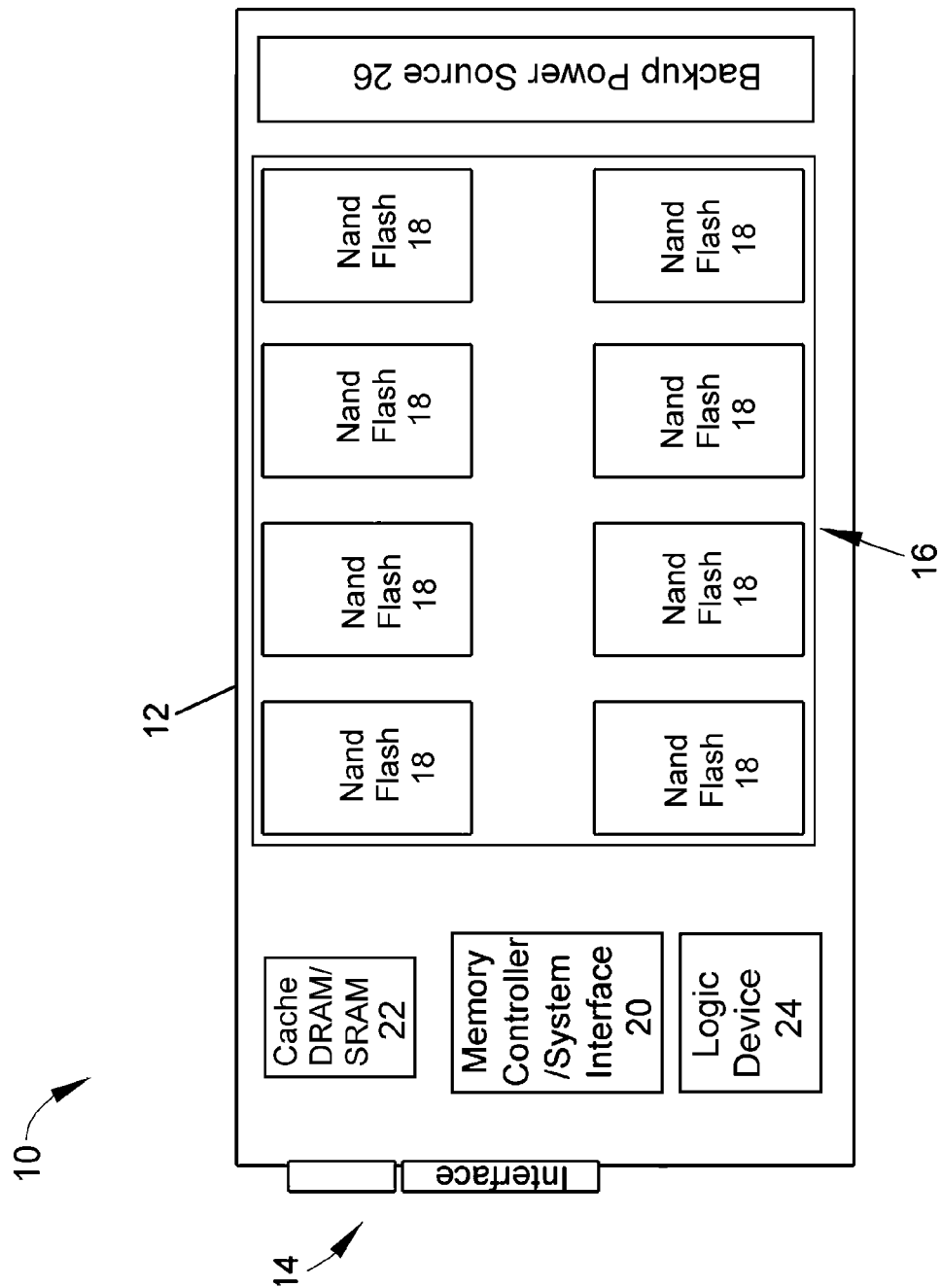
FIG. 1 is a schematic diagram of a NAND-based SSD with an additional SoC and backup power source for offline operation in accordance with a first embodiment of the invention.

The present invention is generally applicable to computers and other processing apparatuses, and particularly to computers and apparatuses that utilize nonvolatile (permanent) memory-based mass storage devices, a notable example of which are solid-state drives (SSDs) that make use of NAND flash memory devices. FIG. 1 is schematically representative of such a SSD 10. The SSD 10 is represented as being configured as an internal mass storage device for a computer or other host system (not shown) equipped with a data and control bus for interfacing with the SSD 10. The bus may operate with any suitable protocol in the art, preferred examples being the advanced technology attachment (ATA) bus in its parallel or serial iterations, fiber channel (FC), small computer system interface (SCSI), and serially attached SCSI (SAS).

As known in the art, the SSD 10 is adapted to be accessed by the host system with which it is interfaced. In FIG. 1, this interface is through a connector (host) interface 14 carried on a drive package that includes a printed circuit board 12. Access is initiated by the host system for the purposed of storing (writing) data to and retrieving (reading) data from an array 16 of solid-state nonvolatile memory devices 18 carried on the circuit board 12. According to a preferred aspect of the invention represented in FIG. 1, the memory devices 18 are NAND flash memory devices 18 that allow data retrieval and storage in random access fashion. The memory devices 18 are preferably accessed in parallel by a memory controller/system interface (controller) 20, through which data pass when being written to and read from the memory devices 18. The controller 20 may comprise, for example, a host bus interface decoder and a memory controller capable of addressing the array 16 of memory devices 18. Protocol signals received through the interface 14 are translated by an abstraction layer of the controller 20 from logical to physical addresses on the memory devices 18 to which the data are written or from which they are read. The controller 20 also addresses a volatile memory cache 22 integrated on the SSD 10. The volatile memory cache 22 may be, for example, DRAM or SRAM-based, as known in the art.

In the embodiment represented in FIG. 1, the controller 20 can be a standard controller of a type conventionally used in commercially available SSDs. The SSD 10 is represented in FIG. 1 as based on a standard SSD design, but modified to enable the SSD 10 to perform offline and/or off-power background scrubbing of the memory devices 18. In particular, the SSD 10 includes an internal system logic device 24 in addition to the controller 20. According to a preferred aspect of the invention, the system logic device 24 has the capability to execute copy commands without accessing the host system. In addition, the SSD 10 is schematically represented as further including a backup power source 26, for example, in the form of a battery and/or supercapacitor ("supercap"), that enables the SSD 10 to operate when its host system is powered down or when the SSD 10 is disconnected from its host system. The backup power source is preferably charged automatically when the SSD 10 is online and powered by its host system, or connected to another power source, for example, an external power brick. For extended offline storage, the SSD 10 may also receive external power through a dedicated power-only connection, for example in a specialized storage rack.

Preferred internal system logic devices 24 for use with the SSD 10 include system-on-a-chip or system-on-a-card (SoC) devices that contain their own processor and integrated memory. As known in the art, an SoC device is distinguishable from conventional controllers (such as the controller 20) in terms of its functionality. As an example, a typical SoC device will often include a microprocessor, integrated memory such as an array of ROM, RAM, EEPROM and/or flash memory, a timing source, peripherals such as real-time clocks, voltage regulators, and power management circuits.

The SoC device 24 employed by the present invention is configured to perform the aforementioned scrubbing of the memory devices 18. For this purpose, a preferred function of the SoC device 24 is to prioritize preemptive scrubbing of addresses in the memory devices 18 on the basis of risk of data loss, which in turn is based on one or more parameters that can be logged with integrated memory of the SoC device 24. In particular, the SoC device 24 is used to analyze house-keeping data relating to the SSD 10, including but not limited to such parameters as the number of read accesses of a block of memory along with the age (timestamp) of each access to calculate the conglomerate access frequency, the number of previous erases of a block of memory, the programming time of a block of memory, the erase time of a block of memory, the number of error bits needing correction through ECC algorithms, and the physical distribution of read and write accesses to blocks of memory in proximity to an address of interest. The latter can be employed to generate a write disturbance "risk map" that can be used to predict the failure of a memory block resulting from proximity disturbances that can occur within a memory cell when a nearby cell is read or written to. In any case, data in any memory block determined to be at risk of data loss ("bad") by the SoC device 24 is moved, or scrubbed, from the bad block and moved to another address.

The preferred SoC device 24 further features a real-time clock from on which all timestamps can be generated and with which offline times can be logged. As such, the SoC device 24 can be programmed to initiate a scrubbing operation after a period of time has elapsed after the SSD 10 has gone offline.

The SoC device 24 can also be programmed to perform a battery check to ensure enough power is available from the backup power source 26 to perform a scrub action. In addition, the SoC device 24 can be programmed to act as a host controller to initiate garbage collection and perform proactive erases of blocks that no longer have any pointers associated with them. The SoC device 24 can also act as a host to scan the SSD 10 and consolidate partial blocks of memory. During offline periods, the SoC device 24 is typically in a deep power-down state but can be awakened periodically if it receives an appropriate signal from its real-time clock, for example, an interrupt request. The periodic wake-up states can be used to log the temperature of the circuit board 12 or individual memory devices 18. Alternatively or in addition, a temperature or temperature change that exceeds a predetermined threshold can be used to wake up the controller 20.

Figure 2:
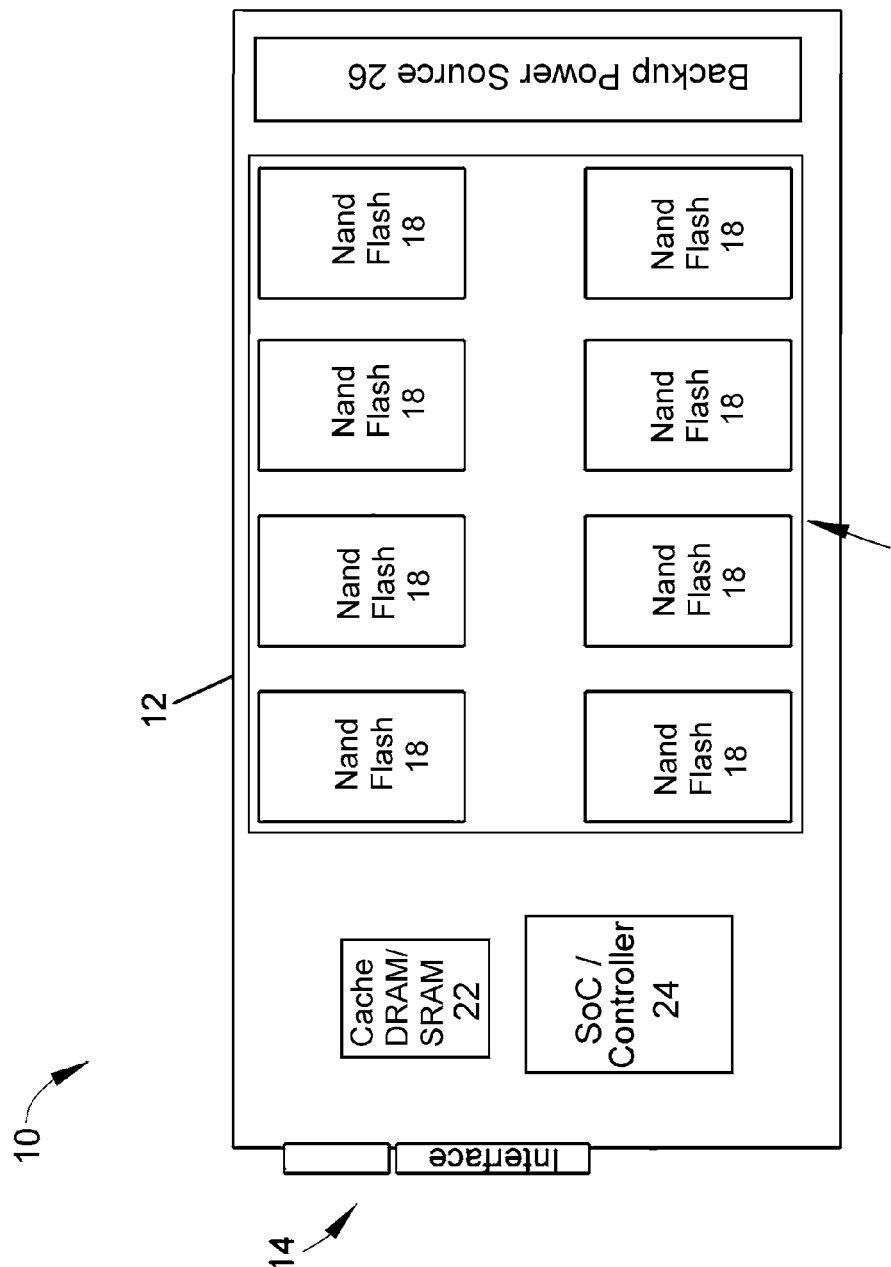
FIG. 2 is a schematic diagram of a NAND-based SSD similar to FIG. 1, but with its entire logic integrated on an SoC in accordance with a second embodiment of the invention.

FIG. 2 shows another embodiment of the invention in which the function of the controller 20 is integrated onto the SoC device 24. In this embodiment, the SoC device 24 can further use the volatile memory cache 22 as additional memory for temporary data storage during copy activity. After a block of memory cells of a memory device 18 is copied on the basis of analyzing any or all of the aforementioned house-keeping data parameters, the block can be erased and the time to erase can be used to determine the viability of the block. If the block is determined to be no longer viable, it is preferably retired and added to a pool of reserve blocks. Periodically, the reserve blocks can be tested to determine whether the viability of any reserve block has recovered, which can occur due to temperature cycling and other environmental factors. If a tested reserve block meets operability requirements, it can be returned to the standard pool of blocks.

While certain components are shown and preferred for mass storage devices of this invention, it is foreseeable that functionally-equivalent components could be used or subsequently developed to perform the intended functions of the disclosed components. Therefore, while the invention has been described in terms of a preferred embodiment, it is apparent that other forms could be adopted by one skilled in the art, and the scope of the invention is to be limited only by the following claims.

The invention claimed is:

1. A self-powered solid-state drive configured to perform offline scrubbing of solid-state mass storage media, the drive comprising:
   a package comprising a printed circuit board;
   a system interface coupled to the circuit board and adapted to connect the drive to a host system;
   at least one nonvolatile memory device on the circuit board;
   controller means on the circuit board through which data pass when being written to and read from the memory device;
   a volatile memory cache on the circuit board;
   means on the circuit board for performing the function of a real-time clock on the circuit board;
   a system logic device configured to operate when the drive is not functionally connected to a host system, execute copy commands without accessing a host system, and prioritize preemptive scrubbing of addresses in the memory device on the basis of risk of data loss based on one or more parameters logged by the internal system logic device; and
   an integrated power source on the circuit board for powering the drive.

2. The self-powered solid-state drive of claim 1, wherein the power source is a battery or a supercapacitor.

3. The self-powered solid-state drive of claim 1, wherein the system logic device comprises a processor that executes the copy commands without accessing a host system and prioritizes the preemptive scrubbing of the addresses in the memory device, and integrated memory for recording the one or more parameters.

4. The self-powered solid-state drive of claim 1, wherein the system logic device comprises the means for performing the function of a real-time clock.

5. The self-powered solid-state drive of claim 1, wherein the system logic device is a system-on-a-card or a system-on-a-chip.

6. The self-powered solid-state drive of claim 5, wherein the controller means is a discrete component on the circuit board separate from the system logic device.

7. The self-powered solid-state drive of claim 5, wherein the controller means is integrated on the system logic device.

8. The self-powered solid-state drive of claim 1, wherein the system logic device is adapted to initiate the preemptive scrubbing of the addresses in the memory device at a predetermined time after the drive is no longer functionally connected to a host system.

9. The self-powered solid-state drive of claim 1, wherein the one or more parameters used by the system logic device to prioritize the preemptive scrubbing of the addresses in the memory device comprise at least one of the following parameters: age of data at an address, number and frequency of accesses of data at an address, time to program a block of memory of the solid-state mass storage media, time to erase a block of memory of the solid-state mass storage media, and number of errors corrected through ECC algorithms.

10. The self-powered solid-state drive of claim 1, wherein the one or more parameters used by the system logic device to prioritize the preemptive scrubbing of the addresses in the memory device comprise the physical distribution of read and write accesses to a plurality of addresses in the memory device in proximity to another address in the memory device.

11. A method of performing an offline scrubbing operation using the self-powered solid-state drive of claim 1, the method comprising prioritizing the scrubbing operation based on at least one of the parameters analyzed by the system logic device and chosen from the group consisting of: age of data at an address of the solid-state mass storage media; number and frequency of accesses of data at an address of the solid-state mass storage media; time to program a block of memory of the solid-state mass storage media; time to erase a block of memory of the solid-state mass storage media; and number of errors corrected through ECC algorithms to identify data corruption at an address of the solid-state mass storage media, proactively restore data based on ECC algorithms, and copy the restored data to a new address of the solid-state mass storage media.

12. A method of performing offline scrubbing solid-state mass storage media of a self-powered solid-state drive, the method comprising:

initiating a scrubbing operation to be performed by a system logic device on blocks of memory of the solid-state mass storage media following a predetermined period of time after the drive has gone offline from a host system; and prioritizing the scrubbing operation based on at least one parameter analyzed by the system logic device and chosen from the group consisting of: age of data at an address of the solid-state mass storage media; number and frequency of accesses of data at an address of the solid-state mass storage media; time to program a block of memory; time to erase a block of memory; and number of errors corrected through ECC algorithms;

performing the scrubbing operation with the system logic device, the scrubbing operation comprising determining whether data in a first block of memory at a first address are at risk of data loss, moving the data in the first block to a second block at a second address, and then invalidating the first block.

13. The method of claim 12, further comprising identifying data corruption at an address of the solid-state mass storage media, proactively restoring data based on ECC algorithms, and copying the restored data to a new address of the solid-state mass storage media.

14. The method of claim 12, wherein the system logic device comprises a processor that executes copy commands without accessing a host system and prioritizes the scrubbing operation, and integrated memory for recording the at least one parameter.

15. The method of claim 12, wherein the system logic device calculates the predetermined period of time.

16. The method of claim 12, wherein the time to program and the time to erase are used to determine the viability of a block in an active memory pool of the solid-state mass storage media and move the block from the active memory pool to a reserve memory pool of the solid-state mass storage media if the time to program or time to erase exceeds a threshold.

17. The method of claim 16, wherein the block in the reserve pool is checked to determine recoverability of the block caused by environmental factors.

* * * * *